United States Patent
Hauser

(10) Patent No.: US 7,380,758 B2
(45) Date of Patent: Jun. 3, 2008

(54) LINE CLIP

(75) Inventor: Ingo Hauser, Rheinfelden (DE)

(73) Assignee: A. Raymond & CIE, Grenoble (FR)

( * ) Notice: Subject to any disclaimer, the term of this patent is extended or adjusted under 35 U.S.C. 154(b) by 113 days.

(21) Appl. No.: 10/508,226

(22) PCT Filed: Mar. 6, 2003

(86) PCT No.: PCT/EP03/02268

§ 371 (c)(1),
(2), (4) Date: Jul. 21, 2005

(87) PCT Pub. No.: WO03/081106

PCT Pub. Date: Oct. 2, 2003

(65) Prior Publication Data

US 2005/0269462 A1 Dec. 8, 2005

(30) Foreign Application Priority Data

Mar. 21, 2002 (DE) .................. 102 12 484

(51) Int. Cl.
*F16L 3/22* (2006.01)
(52) U.S. Cl. .................... 248/68.1; 248/74.4
(58) Field of Classification Search ........... 248/68.1, 248/49, 74.1, 74.4
See application file for complete search history.

(56) References Cited

U.S. PATENT DOCUMENTS

| | | | |
|---|---|---|---|
| 3,002,241 A | 10/1961 | Scurlock | |
| 3,126,184 A * | 3/1964 | Kropp | 248/73 |
| 3,203,655 A | 8/1965 | Montague | |
| 3,421,187 A * | 1/1969 | Ryder | 403/391 |
| 3,954,238 A * | 5/1976 | Nivet | 248/68.1 |
| 4,264,047 A * | 4/1981 | Nelson | 248/73 |
| 4,669,156 A * | 6/1987 | Guido et al. | 24/336 |
| 5,060,810 A * | 10/1991 | Jones | 211/59.4 |

(Continued)

FOREIGN PATENT DOCUMENTS

DE 24 46 133 A 4/1975

(Continued)

*Primary Examiner*—Anita M. King
(74) *Attorney, Agent, or Firm*—Gifford, Krass, Sprinkle, Anderson & Citowski, P.C.

(57) ABSTRACT

The invention relates to a line clip, by means of which adjacent supply lines of varying types or other long components can be fixed together or fixed to a support piece. The above comprises a housing piece (1), with retaining recesses (5) embodied therein to match the cross-sections of the lines concerned, clipping arms (6), moulded on both sides of the retaining recess (5), which are inclined towards each other and a securing clip (2) which way be placed over the housing piece (1) with counter recesses (16) embodied thereon which are complementary to the reraining recess of the housing piece (1) and also match the cross sections of the lines. Locking elements (18) are moulded at both ends of the housing piece (1) and the securing clip (2), which clip into each other on placing the securing clip (2) on the housing piece (1). Several or a larger number of lines may be accommodated in a smaller space than before in such a line clip if the clipping regions defined by the clipping arms (6) on the various retaining recesses are offset relative to each other without causing a hindrance to the fitting of the lines.

16 Claims, 4 Drawing Sheets

U.S. PATENT DOCUMENTS

| | | | | |
|---|---|---|---|---|
| 5,184,794 A | * | 2/1993 | Saito | 248/68.1 |
| 5,263,671 A | * | 11/1993 | Baum | 248/68.1 |
| 5,363,539 A | * | 11/1994 | Tisol | 24/543 |
| 5,820,048 A | * | 10/1998 | Shereyk et al. | 248/68.1 |
| 5,947,426 A | * | 9/1999 | Kraus | 248/74.2 |
| 6,565,049 B2 | * | 5/2003 | Hahn | 248/68.1 |
| 6,915,990 B2 | * | 7/2005 | Maruyama | 248/68.1 |
| 2005/0178930 A1 | * | 8/2005 | Yon | 248/68.1 |

FOREIGN PATENT DOCUMENTS

| | | |
|---|---|---|
| DE | 38 02 698 A | 8/1989 |
| EP | 0 454 876 A | 11/1991 |
| EP | 0 683 343 A | 11/1995 |

* cited by examiner

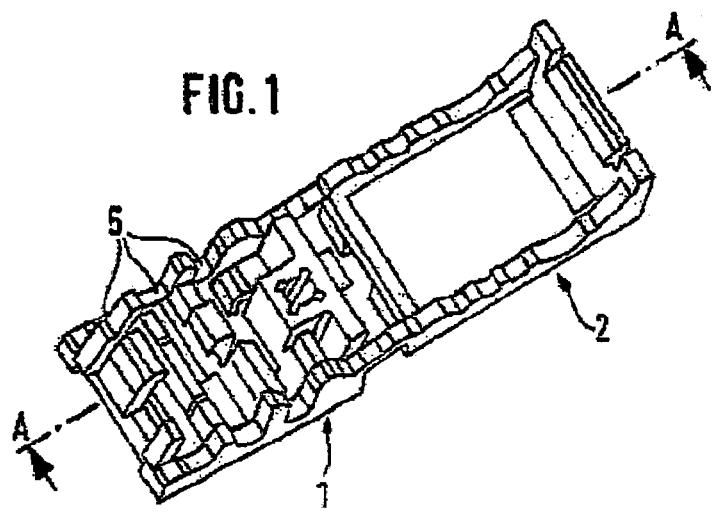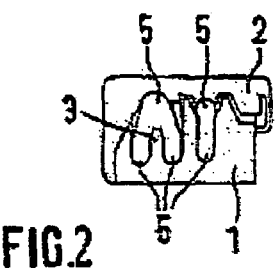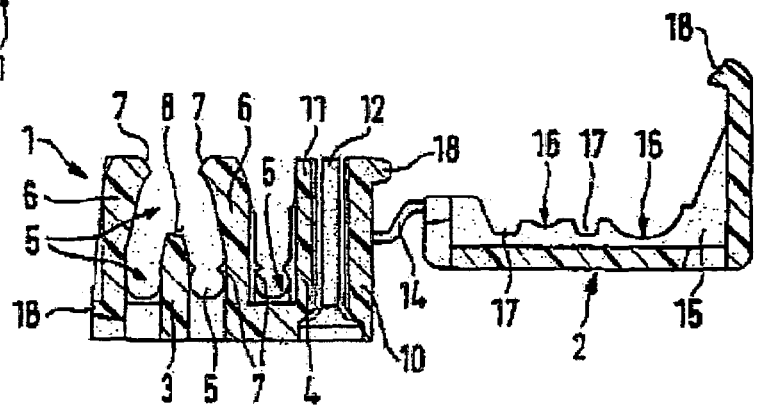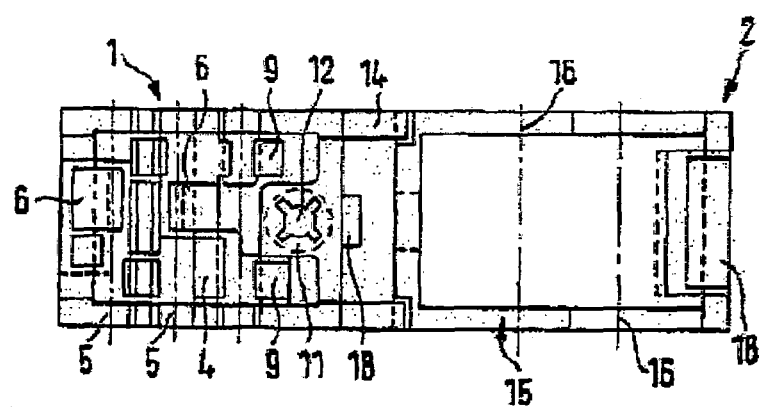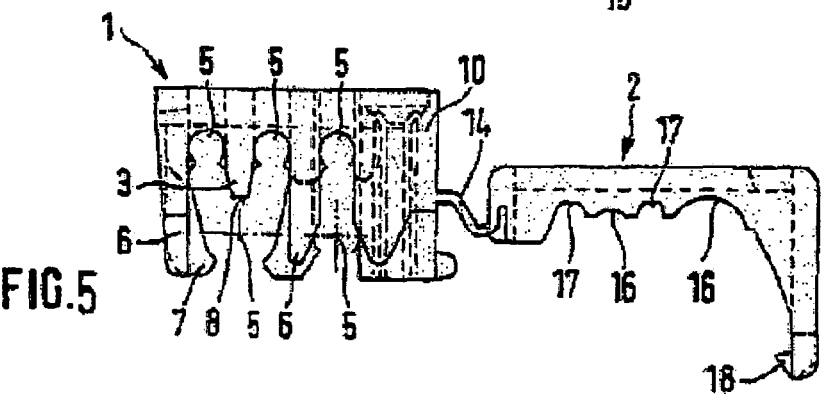

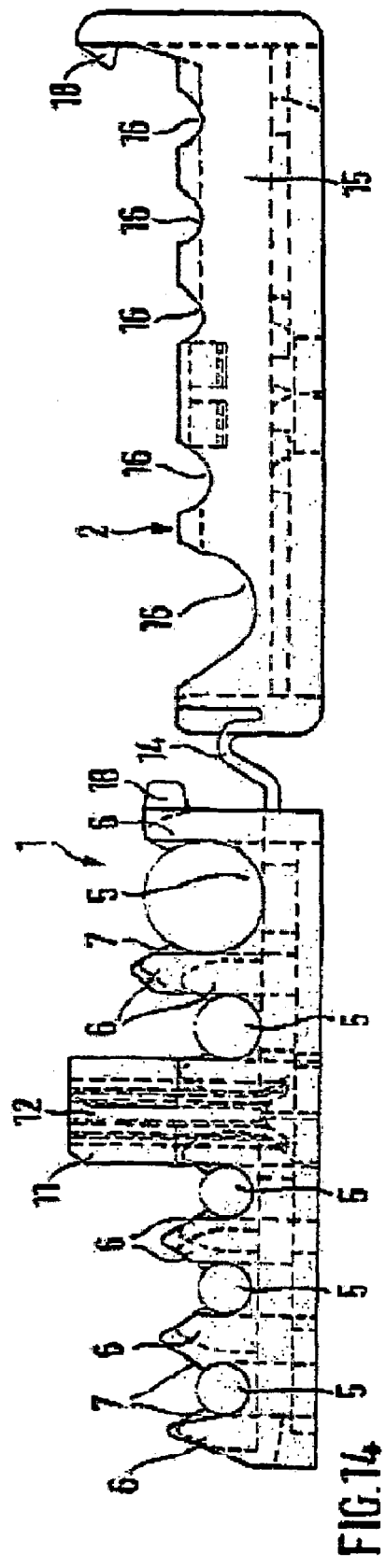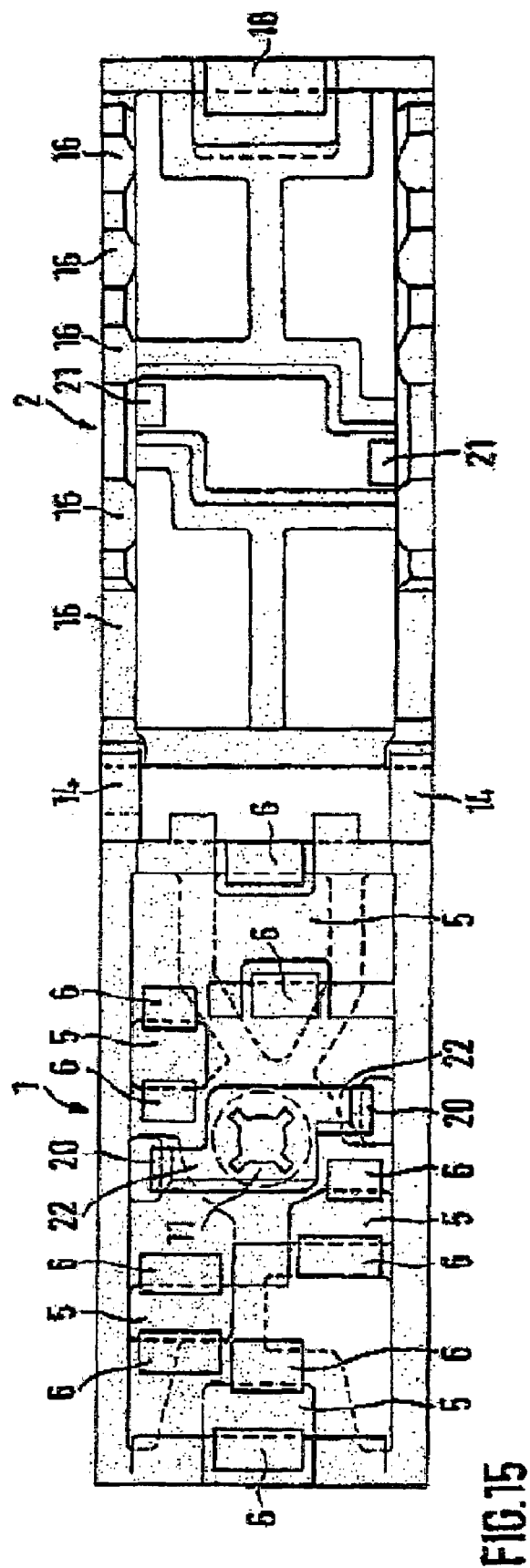

LINE CLIP

The invention relates to a line clip for fastening adjacent supply lines of various types or other long components to a carrier component and/or for the mutual fastening of such adjacent supply lines or long components, consisting of a receiving part with holding troughs formed on it and adapted to the particular line cross sections and with clamping legs formed on both sides of the holding troughs, and consisting of a safety bracket that can be laid over the receiving part and that has countertroughs that are designed in a complementary manner to the holding troughs of the receiving part and are also adapted to the line cross sections, wherein engagement elements are formed on both ends of the receiving part and of the safety bracket that engage into each other when the safety bracket is laid on the receiving part.

There is a need, especially in vehicle construction, to house several supply lines of various types, that is, e.g., for fuel and/or power cables, in the narrowest possible space and to fix them mutually and also to the carrier component, e.g., on steel sheet. The supply lines must of course not disturb each other and also their mounting must not be unnecessarily hindered. DE 38 02 698 A1 teaches a line clip in which a holding trough is provided on one side adjacent to the clamping body that can be set on a bolt, and on its other side two holding troughs for pipelines are provided adjacent to one another. Each holding trough has two clamping legs that surround the particular pipeline in a clip-like manner. The adjacent clamping legs of the two holding troughs arranged adjacent to one another maintain a spacing from one another into which the safety bracket engages with a clamping element after the insertion of the lines during the closing of the safety bracket. As a consequence of the spacing between the holding troughs and the adjacent clamping legs, the lines do not hinder each other, even during assembly. One the other hand, this line clip requires a relatively large amount of space for a total of only three supply lines, which becomes even more disadvantageous if more supply lines are added.

DE 24 46 133 A1 teaches a line clip in the case of which adjacent clamping legs of different lines, which legs are formed on the receiving part, have a common root, separate upward in a dovetail manner, and are bent in an opposing manner in a clip-like fashion. The dovetail allows the clamping legs to expand when the lines are laid in. However, the space saving achieved is extremely small compared to a design with completely separated clamping legs because the common root must have approximately double the width of a single clamping leg.

EP 0 454 876 B1 teaches a bipartite line clip in which two adjacent holding troughs on the receiving part are separated by a common clamping leg and on the latter oppositely directed hooks staggered in the longitudinal direction of the lines to be received are formed that place themselves in a clip-like manner on the lines. In spite of the hooks staggered in the longitudinal direction, a hindrance during the mounting of the lines cannot be completely excluded if the one holding trough has already been filled and a line is to be placed into the adjacent holding trough.

The receiving part and the safety bracket of these known line clips have engagement elements on their narrow ends that mutually engage into each other during the closing of the safety bracket. It has turned out that given the tendency to fix more and more different lines with one line clip, this catch on the two ends is no longer sufficient. As the number of lines rises, the line clips must become wider and wider, and the receiving part and the safety bracket finally tend to curve in toward the middle.

The invention addresses the problem of creating a line clip that permits several different supply lines to be mutually fixed to a carrier part while saving as much space as possible and also as the number of lines to be received rises, a curving up of the safety bracket and/or of the receiving part should be avoided.

The invention achieves this in that the clamping areas defined by the clamping legs on the various holding troughs are staggered relative to one another. This results in the arrangement of the holding troughs and clamping legs in a distinct saving of space that permits the housing of several or even of a larger number of supply lines in a narrow space.

According to a first embodiment of the invention the clamping legs enclose holding troughs in two superposed planes by means of clamping noses inclined towards each other.

Two holding troughs running adjacent to each other in one plane are advantageously separated from one another by a low separating wall and grasped by two clamping legs raised up on both sides; clamping noses inclined and bent toward each other are formed on the free ends of the clamping legs which noses determine together with the curved front surface of the separating wall another holding trough for another supply line. Thus, lines can be fixed in two planes and independently of each other.

According to another embodiment the adjacent clamping legs of two holding troughs running parallel to one another extend in the longitudinal direction of the lines to be received only over a partial section of the receiving part and are staggered relative to each other in this longitudinal direction. In this manner several supply lines can be fixed relative to each other in one plane in a space-saving manner without hindrances occurring.

According to one preferred embodiment of the invention the adjacent clamping legs of two holding troughs running parallel to one another extend in the longitudinal direction of the lines to be received only over a partial section of the receiving part and are staggered relative to each other in the longitudinal direction as well as in the transverse direction and can partially overlap in the transverse direction. The staggered arrangement in two directions and the overlapping create an additional saving of space.

According to a further development of this embodiment both clamping legs of several holding troughs running parallel to one another extend in the longitudinal direction of the lines to be received only over a partial section of the receiving part and are staggered relative to each other in pairs without mutual contact in the longitudinal direction as well as in the transverse direction and the adjacent clamping legs of two holding troughs partially overlap each other.

In addition, the clamping legs of at least one holding trough can also be staggered relative to each other in the longitudinal direction of the line to be received. This embodiment is especially advantageous if a rather large number of lines is to be received in one line clip.

In order to avoid a sagging of the receiving part and/or of the safety bracket in line clips designed for fixing a rather large number of lines, engagement elements can also be provided on their two longitudinal sides in addition to their two narrow sides which elements engage in each other when the safety bracket is laid on the receiving part.

If a fastening column with a through hole for fastening the line clip to a carrier component is formed on the receiving part in a known manner between the holding troughs, laterally projecting engagement noses can be provided on the fastening column that engage during the laying of the safety bracket on the receiving part with claws projecting inward from the edge of the safety bracket.

The invention is described in detail in the following with reference made to the attached drawings.

FIG. 1 shows a perspective view of a first embodiment of the invention on a reduced scale and in a still open state.

FIG. 2 shows a side view of the embodiment according to FIG. 1 in the closed state.

FIG. 3 shows a section along axis A-A through the embodiment according to FIG. 1 on a larger scale.

FIG. 4 shows a top view of the embodiment according to FIG. 1 on the scale of FIG. 3.

FIG. 5 shows a view of the same embodiment tilted by 90° relative to FIG. 4.

FIG. 14 shows a side view of the embodiment according to FIG. 12 on a larger scale and in the open state.

FIG. 15 shows a top view of the embodiment according to FIG. 12 on the scale of FIG. 14 and in the open state.

Figure 6:
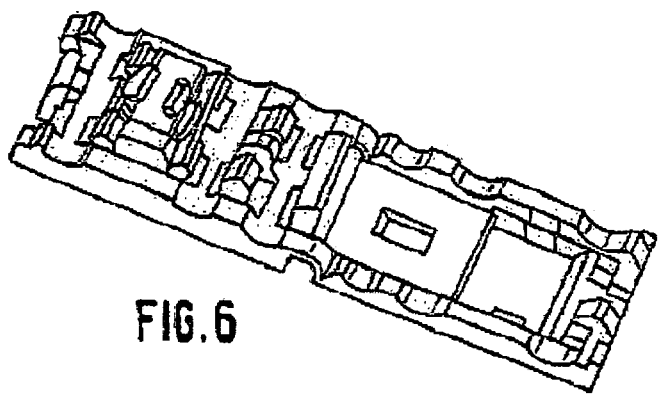
FIG. 6 shows a perspective view of a second embodiment of the invention on a reduced scale and in a still open state.

A first embodiment of a line clip of the invention is shown in FIGS. 1 to 5. The line clip consists of receiving part 1 with a substantially rectangular basic outline and with safety bracket 2 articulated to it on its one narrow side. At first, three holding troughs 5 for supply lines with a cross sectional diameter of 4.75 mm in the example are provided in receiving part 1, which troughs are separated from each other by separating walls 3, 4 and are arranged adjacent to each other at the same height. Holding troughs 5 located closer to the free end of receiving part 1 form a holding-trough pair and are separated from one another by low, conically tapering separating wall 3. They are jointly held by clamping legs 6 that are raised up on both sides and curved toward each other and on whose upper ends clamping noses 7 directed toward each other are formed. Clamping noses 7 are formed in such a manner that their inner surfaces describe, together with front surface 8 of separating wall 3, sections of an upwardly open circular arc whose diameter corresponds to the cross section of another supply line, 10 mm in the example shown. Inner clamping leg 6 is located on a line with separating wall 4, divided into two parts by this clamping leg 6, at the inner lying holding trough 5 that is limited on its other side by two laterally upwardly extending struts 9 and by fastening column 11 located between these struts and formed on inner wall 10 of receiving part 1. Through hole 12 is provided in this fastening column 11 for receiving a bolt or a screw with which the line clip can be fastened to a carrier component (not shown). Other clamping noses 7 can be provided on separating walls 3, 4 and struts 9 which noses shape holding troughs 5 in their cross section to an upwardly open divided circle. Inner surfaces of separating walls 4 and of inner clamping leg 6 facing each other on the one side and of struts 9 and the fastening column 11 on the other side are formed in the vicinity of their free end and at a spacing over holding trough 5 located on the inside in accordance with the cross section of another supply line.

Receiving part 1 described here by way of example can thus receive a total of five different supply lines in two superposed plates in a narrow space, namely, in holding troughs 5, between the free ends of struts 9 and of separating walls 4 and between front surface 8 of separating wall 3 and clamping noses 7 of resilient clamping legs 6 without the supply lines and their mounting being disturbed. This is basically achieved in that clamping elements 6, 7 for the individual supply lines are staggered and arranged at least partially overlapping each other in such a manner that they do not influence each other mutually or influence each other mutually only minimally or that they cannot hinder each other when unbending.

Rectangular safety bracket 2 is articulated to inner wall 10 of receiving part 1 by narrow webs 14 and comprises upwardly projecting edge 15 on each of its two longitudinal sides. Countertroughs 16 shaped like a partial circle are provided in these edges 15, and the countertroughs 16 supplement or close the circular arcs defined between the free ends of clamping legs 6 or clamping noses 7 and between the free ends of separating walls 4 and struts 9 when safety bracket 2 is laid over receiving part 1 so that the previously inserted supply lines are held securely in place. Moreover, recesses 17 are present in edges 15 into which recesses the ends of struts 9 and of separating walls 4 fit during the laying over of safety bracket 2.

Cooperating engagement elements 18 are provided in a known manner on the two narrow sides of receiving part 1 and safety bracket 2, and the elements 18 intermesh during the laying over of safety bracket 2 and thus reliably hold the line clip closed.

FIGS. 6 to 11 show a second embodiment of the invention. The basic form is the same as described above: a rectangular receiving part 1 and a rectangular security bracket 2 are articulated to one another on their adjacent narrow sides. Holding troughs 5 for three supply lines are provided in receiving part 1, and the supply lines are held by clip-shaped expandable clamping legs 6 with facing clamping noses 7 for receiving the supply lines. Fastening column 11 with through hole 12 for receiving a fastening bolt or fastening screw separates holding trough 5 with its clamping legs 6 running next to the free end of receiving part 1 from a holding-trough pair 5. Even inner clamping legs 6, which are directly adjacent to each other, of the two holding troughs 5 are entirely independent of each other. They extend in the longitudinal direction of the lines to be received only over a partial section of the particular holding trough 5 in each instance and are arranged staggered in the longitudinal direction of holding troughs 5 as well as in the direction of the transverse axis. It is preferable if, as can best be seen from FIGS. 8 and 9, the adjacent clamping legs 6 of two holding troughs 5 can overlap in the direction of the transverse axis. As a result of this arrangement and design inner clamping legs 6 are also completely separated from each other so that when the supply lines are set in, no hindrance can occur and yet the lines come to rest very close to each other in a space-saving manner on account of the staggered and overlapping arrangement of the lines. Stiffening element 19 can be arranged on the transverse axis between staggered clamping legs 6 in order to prevent an erroneous mounting on the holding elements and to protect them from damage.

Figure 7:
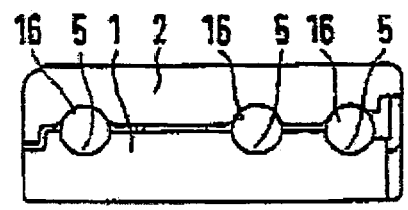
FIG. 7 shows a side view of the embodiment according to FIG. 6 in the closed state.
Figure 8:
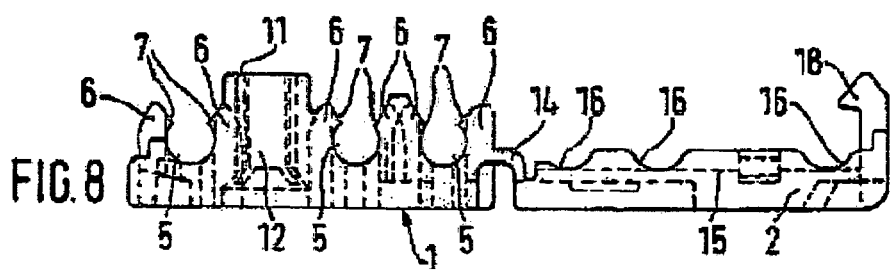
FIG. 8 shows a side view of the embodiment according to FIG. 6 on a larger scale and in a still open state.
Figure 9:
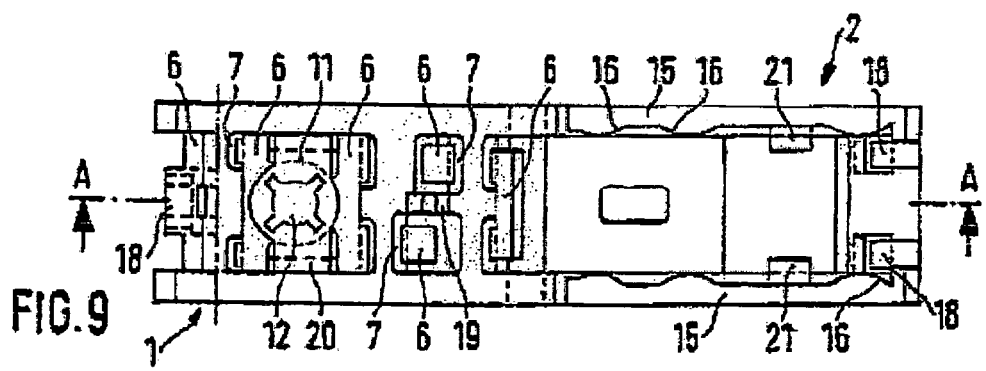
FIG. 9 shows a top view of the embodiment according to FIG. 6 on the scale of FIG. 8 and in the open state.
Figure 10:
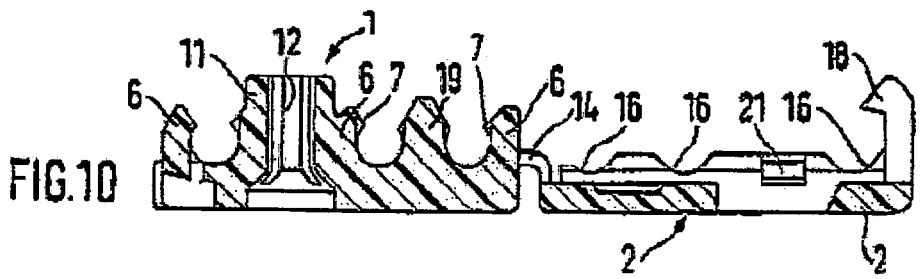
FIG. 10 shows a sectional view along axis A-A in FIG. 9.
Figure 11:
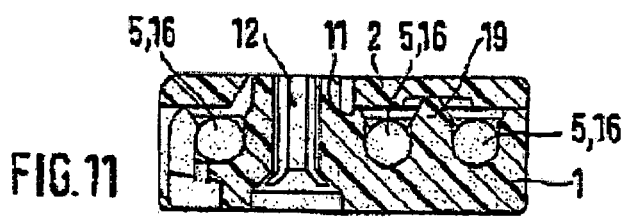
FIG. 11 shows a sectional view according to FIG. 10 in the closed state of this embodiment.
Figure 12:
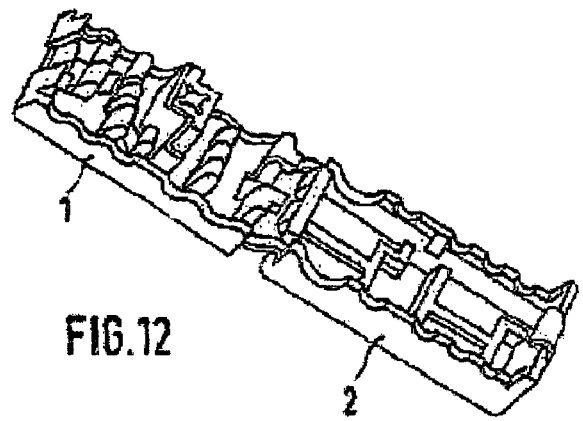
FIG. 12 shows a perspective view of a third embodiment of the invention on a reduced scale and in the open state.
Figure 13:
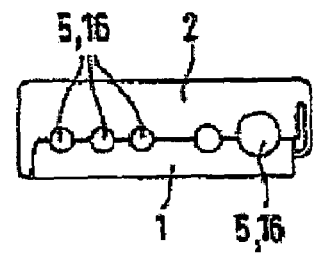
FIG. 13 shows a side view of the embodiment according to FIG. 12 in the closed state.

When safety bracket 2 is laid over receiving part 1 after the insertion of the supply lines, countertroughs 16 provided in longitudinal edges 15 of safety bracket 2 supplement holding troughs 5 into a circle closed in its cross section in this instance too, see FIG. 7, and the lines are securely fixed. In addition to cooperating engagement elements 18 provided on the narrow sides of receiving part 1 and of safety bracket 2 in a known manner, which elements hold the line clip closed after the placing of safety bracket 2, another safety mechanism operating in this manner can be provided. According to the embodiment shown, to this end engagement noses 20 projecting on both sides from fastening column 11 are provided that cooperate with inwardly directed claws 21 formed on both edges 15 of safety bracket 2. This additional safety is particularly advantageous for line clips designed for receiving a fairly large number of lines.

FIGS. 12 to 15 show an embodiment of the invention designed, starting from the basic form already described, for the holding and mutual fixing of five different supply lines in one plane. Holding troughs 5 for five different supply lines that can also have different cross sections are provided in rectangular receiving part 1 on both sides of fastening column 11 with through-hole 12. In the example shown, holding troughs 5 for three lines with the same cross section are provided between the free end of receiving part 1 and fastening column 11, and holding troughs 5 for two lines with different and larger cross sections are provided between fastening column 11 and the end connected to safety bracket 2. Each of the holding troughs 5 is held by a separate pair of clip-shaped clamping legs 6 with clamping noses 7. Clamping legs 6 extend in the longitudinal direction of the lines to be received only over a partial section of receiving part 1 and are staggered relative to each other in pairs both in the longitudinal direction of the lines to be received as well as in the transverse direction in such a manner that no mutual hindering or adverse influencing of clamping legs 6 or of the lines to be received can occur. It is preferable if adjacent clamping legs 6 of two holding troughs 5 running adjacent to one another overlap at least partially in the transverse direction, but without contacting one another. In this manner several different supply lines, five in the example shown, can be received and fixed adjacent to each other by the line clip in a narrow space. Also in this embodiment countertroughs 16 to holding troughs 5 are provided in edge 15 of safety bracket 2, and the countertroughs 16 close holding troughs 5 at clamping legs 6 when safety bracket 2 is placed on receiving part 1 or come to rest tightly on the lines in the area outside clamping legs 6 so that the lines are securely held.

Engagement noses 20 projecting away from fastening column 11 are also provided here in addition to engagement elements 18 provided on the two narrow sides of receiving part 1 and safety bracket 2 for securing the line clip in the closed state (see FIG. 13), and the noses 20 cooperate with claws 21 inwardly projecting from edges 15 of safety bracket 2.

Figure 16:
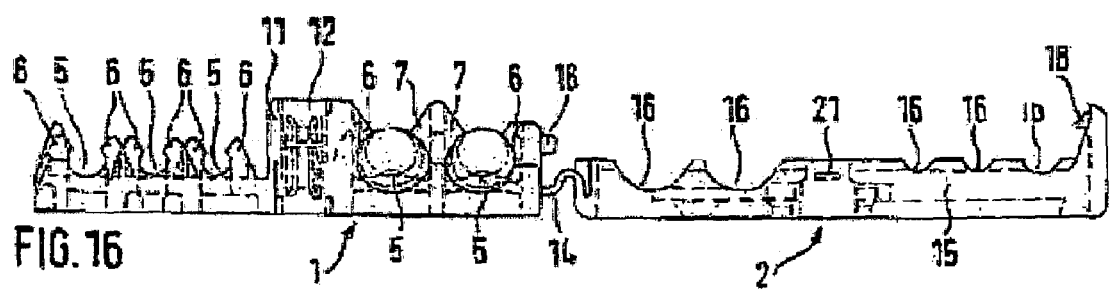
FIG. 16 shows a side view of a fourth embodiment of the invention on a larger scale and in the open state.
Figure 17:
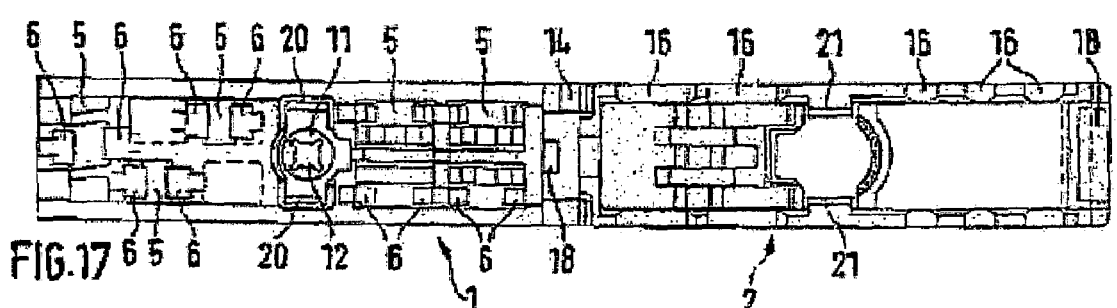
FIG. 17 shows a top view onto the embodiment of FIG. 16.
Figure 18:
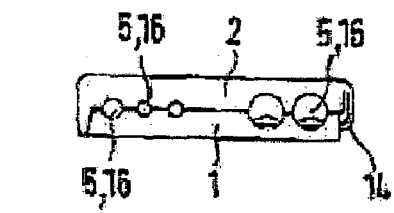
FIG. 18 shows a side view of the embodiment according to FIG. 16 on a reduced scale and in the closed state.

FIGS. 16 to 18 show another embodiment of the invention starting from the same basic form. Similar to the embodiment according to FIGS. 12 to 15, three holding troughs 5 for supply lines with two different diameters are provided on receiving part 1 on the one side of fastening column 11, and on the other side of fastening column 11 two holding troughs 5 are provided for supply lines of another, larger diameter. In this instance clamping legs 6 of holding troughs 5 for the two larger lines are not staggered but rather are located in pairs on one line. Clamping legs 6 of the three first-cited holding troughs 5 are staggered in pairs both in the longitudinal direction of the lines to be received as well as in the transverse direction in a manner already described for the embodiment of FIGS. 12 to 15. Moreover, the two clamping legs 6 of at least one holding trough 5, of the outermost holding trough 5 in the instance shown, are additionally staggered relative to one another in the longitudinal direction of the lines to be received. This permits the adjacent holding trough 5 with its clamping legs 6 to be approached once more closer to the first holding trough without the clamping area on the lines having to be shortened further.

The invention claimed is:

1. A line clip for fastening lines to a carrier component comprising:
   a receiving part with integrally formed holding troughs adapted to correspond to a cross-sectional size of the lines, wherein a clamping leg is formed on a side of each of the holding troughs, and the clamping leg on the side of each of the holding troughs is inclined towards a center line of the holding trough; and
   a safety bracket connected to the receiving part having countertroughs that are complementary to the holding troughs of the receiving part and adapted to correspond to the cross-sectional size of the line,
   wherein two holding troughs running adjacent to each other in one plane are separated from one another by a low separating wall, and the clamping legs on opposed sides of the holding trough have clamping noses that are inclined and bent toward each other formed on the free ends of the clamping legs, the clamping noses determining together with a curved front surface of the separating wall another holding trough for another supply line; and
   an engagement element formed on an end of the receiving part that engages a corresponding engagement element formed on an end of the safety bracket when the safety bracket is laid on the receiving part, such that each of the clamping areas, defined by the clamping leg on the side of the holding trough, are offset relative to each other.

2. The line clip according to claim 1, wherein the adjacent clamping legs of two holding troughs extend parallel to one another in the longitudinal direction of the lines to be received only over a partial section of the receiving pert and are staggered relative to each other in the longitudinal direction.

3. The line clip according to claim 1, wherein the adjacent clamping legs of two adjacent holding troughs extend in the longitudinal direction of the lines to be received only over a partial section of the receiving part and are staggered relative to each other in the longitudinal direction and also in the transverse direction and partially overlap each other in the transverse direction.

4. The line clip according to claim 1, wherein both clamping legs of several holding troughs extend parallel to one another in the longitudinal direction of the lines to be received only over a partial section of the receiving part and are staggered relative to each other in pairs without mutual contact in the longitudinal direction as well as in the transverse direction and adjacent clamping legs of two holding troughs partially overlap each other.

5. The line clip according to claim 4, wherein the clamping legs of at least one holding trough are offset relative to each other in the longitudinal direction of the line to be received.

6. The line clip according to claim 1, wherein each of the receiving part and the safety bracket is rectangular in configuration, and engagement elements are provided on the two narrow sides and on the two longitudinal sides of both the receiving part and the safety bracket, and the engagement elements engage each other when the safety bracket is laid on the receiving part.

7. A line clip for Listening lines to a carrier component comprising:
   a receiving part with integrally formed holding troughs adapted to correspond to a cross-sectional size of the lines, wherein a clamping leg is formed on a side of each of the holding troughs, and the clamping leg on the side of each of the holding troughs is inclined towards a center of the holding trough; and
   a safety bracket connected to the receiving part having countertroughs that are complementary to the holding troughs of the receiving part and adapted to correspond to the cross-sectional size of the line,
   an engagement element formed on an end of the receiving part that engages a corresponding engagement element formed on an end of the safety bracket when the safety bracket is laid on the receiving part, such that each of the clamping areas, defined by the clamping leg on the side of the holding trough, are offset relative to each other, wherein each of the receiving part and the safety bracket are rectangular in configuration, and the engagement elements are located on the two narrow sides as well as on the two longitudinal sides of both the receiving part and the safety bracket, and the engagement elements engage each other when the safety bracket is laid on the receiving part,
   a fastening column with a through hole for fastening the line clip to the carrier component that is formed on the receiving part between the holding troughs, wherein the fastening column includes laterally projecting engagement noses and the safety bracket includes claws protecting inward from the edge of the safety bracket, such that the claws engage the engagement noses when the safety bracket is laid on the receiving part.

8. A line clip for fastening lines to a carrier component comprising:
   a receiving part having integrally formed holding troughs adapted for receiving the lines, wherein the receiving part includes a horizontally extending base wall;
   a clamping leg extending vertically and upwardly from the base wall of the receiving part on a side of the corresponding holding trough, wherein an upper edge of the clamping leg is inclined towards a center of the holding trough, and the clamping leg is laterally offset a predetermined distance from another clamping leg;
   a safety bracket pivotally connected to the receiving part, wherein the safety bracket includes a countertrough that is complementary to the corresponding holding trough of the receiving part;
   an engagement element formed on an end of the receiving part for operatively engaging a cooperating engagement element formed on an end of the safety bracket, such that a clamping area defined by each clamping leg and corresponding holding trough is offset from an adjacent clamping area on the same plane, when the receiving part engagement element is engaged by the safety bracket engagement element.

9. The line clip according to claim 8, further comprising a clamping nose located on an uppermost edge of the clamping leg, wherein the clamping nose is inclined towards the center of the holding trough.

10. The line clip according to claim 8, wherein two holding troughs running adjacent to each other in one plane are separated by a low separating wall and the clamping legs on opposed sides of the holding trough having clamping noses that are inclined and bent toward each other formed on the free ends of the clamping legs, the clamping noses determining together with a curved front surface of the separating wall another holding trough.

11. The line clip according to claim 8, wherein the adjacent clamping legs of two holding troughs extend parallel to one another in the longitudinal direction of the lines to be received only over a partial section of the receiving part and are staggered relative to each other in the longitudinal direction.

12. The line clip according to claim 8, wherein the adjacent clamping legs of two adjacent holding troughs extend in the longitudinal direction of the lines to be received only over a partial section of the receiving part and are staggered relative to each other in the longitudinal direction and also in the transverse direction and partially overlap each other in the transverse direction.

13. The line clip according to claim 8, wherein both clamping legs of several holding troughs extend parallel to one another in the longitudinal direction of the lines to be received only over a partial section of the receiving part and are staggered relative to each other in pairs without mutual contact in the longitudinal direction as well as in the transverse direction and adjacent clamping legs of two holding troughs partially overlap each other.

14. The line clip according to claim 13, wherein the clamping legs of at least one holding trough are offset relative to each other in the longitudinal direction of the line to be received.

15. The line clip according to claim 8, wherein each of the receiving part and the safety bracket is rectangular in configuration, and engagement elements are provided on the two narrow sides and on the two longitudinal sides of both the receiving part and the safety bracket and the engagement elements engage each other when the safety bracket is laid on the receiving part.

16. The line clip according to claim 15, further comprising a fastening column with a through hole for fastening the line clip to the carrier component that is formed on the receiving part between the holding troughs wherein the fastening column includes laterally projecting engagement noses and the safety bracket includes claws projecting inward from the edge of the safety bracket, such that the claws engage the engagement noses when the safety bracket is laid on the receiving part.

* * * * *